United States Patent [19]

Johnson

[11] 4,290,782
[45] Sep. 22, 1981

[54] GAS SCRUBBER AND METHOD

[76] Inventor: Richard D. Johnson, 29 W. Ash St., Lombard, Ill. 60148

[21] Appl. No.: 88,170

[22] Filed: Oct. 25, 1979

[51] Int. Cl.³ .............................................. B01D 53/10
[52] U.S. Cl. .......................................... 55/60; 55/77; 55/99
[58] Field of Search ............. 55/60, 61, 73, 74, 77–79, 55/99, 228, 390, 474, 479; 261/116

[56] References Cited

U.S. PATENT DOCUMENTS

| | | | |
|---|---|---|---|
| 1,237,571 | 8/1917 | Stewart | 261/123 |
| 1,422,007 | 7/1922 | Soddy | 55/79 X |
| 3,405,508 | 10/1968 | Peters et al. | 55/73 |
| 3,785,126 | 1/1974 | Smitherman | 55/228 |
| 3,795,486 | 3/1974 | Ekman | 55/73 X |
| 3,798,877 | 3/1974 | Lamb | 55/79 |
| 3,823,531 | 7/1974 | Crawley | 55/228 X |
| 3,913,253 | 10/1975 | Juntgen et al. | 55/74 X |
| 4,049,399 | 9/1977 | Teller | 55/79 X |

FOREIGN PATENT DOCUMENTS 217113  6/1924  United Kingdom .................... 55/79

Primary Examiner—Robert H. Spitzer
Attorney, Agent, or Firm—Hill, Van Santen, Steadman, Chiara & Simpson

[57] ABSTRACT

Apparatus and method for scrubbing gases such as flue gases by subjecting the gases to a shower of gas scrubbing solid particulate material. The scrubbing is desirably effected in a downwardly extending passage leading from the top of a stack from which flue gases are diverted into the top of the passage. The aggregate mass of the solid particulate scrubbing material shower may be great enough to cause down draft for improved stack draft. The particulate material is reconditioned after separation from the cleansed gas and reused in the gas scrubbing cycle. Reconditioning of the particulate material in a liquid also effects wetting of the material for improved scrubbing action. The liquid of the particulate material reconditioning bath may be filtered or otherwise reconditioned and recycled. The recycled material may agitate the spent gas scrubbing solid particulate material for improved reconditioning of the material.

9 Claims, 2 Drawing Figures

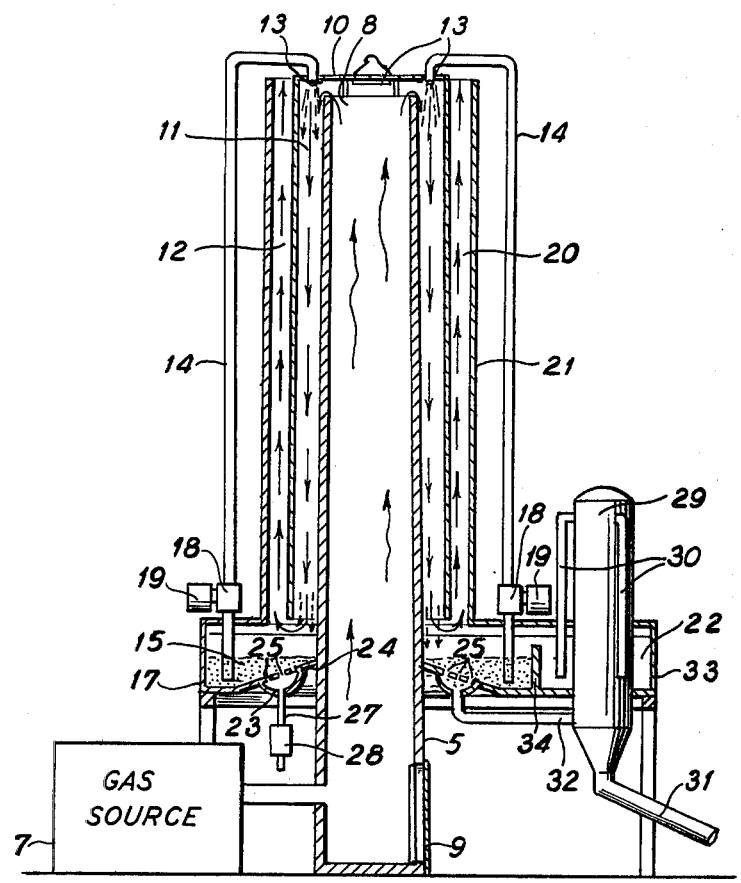
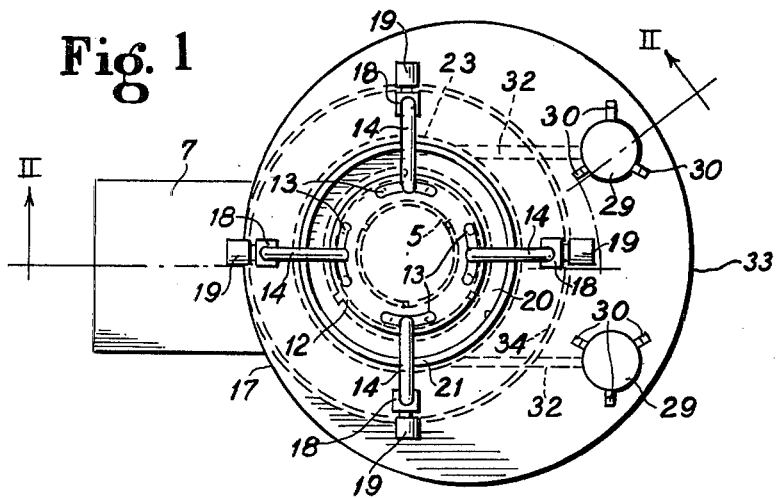

GAS SCRUBBER AND METHOD

This invention relates to the art of removing undesirable constituents entrained in especially industrial gases, and is more particularly concerned with a gas scrubber and method particularly suitable for cleansing flue gases resulting from combustion, e.g., boilers, incinerators, and the like.

Heretofore numerous and varied processes and apparatus have been proposed for removal of various constituents from flowing gas streams, and in particular from the flue gases emanating from stacks or chimneys. Electronic precipitators have been used with considerable effectiveness, but are costly to install and operate. More common apparatus and methods involve the use of various cleansing liquids, water being more usual, and elaborate showering devices have been devised.

While electronic precipitators do not interfere with flue draft, at least some of the proposed showering cleansing devices complicate or to some extend inhibit good flue draft and require auxiliary means for promoting draft. As an example of a liquid shower type of apparatus, U.S. Pat. No. 1,237,571 is referred to.

As those persons familiar with this art are well aware, there is need for an efficient, low cost, simple method of and means for cleaning, cancelling, eliminating certain impurities, noxious substances, and other constituents from, i.e., scrubbing, gases such as flue gases. It is to supplying that need that the present invention is directed.

Accordingly, an important object of the present invention is to provide a new and improved gas scrubber and method.

Another object of the invention is to provide a new and improved gas scrubber and method employing solid particulate material as the principal scrubbing agent.

A further object of the invention is to provide a new and improved flue gas scrubber and method which improves flue draft, simply, efficiently and as an incident to flue gas scrubbing efficacy.

The invention provides an apparatus and method for scrubbing gases, comprising conducting the gases to be scrubbed through a passage. In the passage, subjecting the gases to a shower of gas scrubbing solid particulate material. The scrubbed gases and particulate material are then separated and the particulate material collected. The particulate material is desirably reconditioned and reused in the gas scrubbing cycle. A suitable wetting agent may be employed with the gas scrubbing solid particulate material to improve the scrubbing action of the material. Reconditioning of the particulate material may be effected in a liquid cleaning bath, which bath may be recycled by filtration or other reconditioning process.

Other objects, features and advantages of the invention will be readily apparent from the following description of a certain representative embodiment thereof, taken in conjunction with the accompanying drawing although variations and modifications may be effected without departing from the spirit and scope of the novel concepts embodied in the disclosure and in which:

FIG. 1 is a schematic top plan view of apparatus embodying the invention; and

FIG. 2 is a vertical sectional detail view taken substantially along the line II—II of FIG. 1.

By way of example, a system for scrubbing gases is depicted in FIGS. 1 and 2, associated with a chimney or stack 5 into the lower end portion of which flue gases are delivered from a source 7 such as boiler, incinerator, industrial processing unit, or the like. As is customary in such stacks, the gases from the source 7 after entering the flue within the stack 5 travel upwardly toward an upper open end 8 of the stack. Heavy pollutant particles such as ash may drift to the bottom of the stack and may from time-to-time be cleaned out through an access door 9 or the like. However, as is usual, pollutants such as soot, fine fly ash, sulfur compounds, and the like, will travel onward with the flue gases and unless trapped and cleaned from the flue gases will enter and pollute the atmosphere.

According to the present invention, the upwardly flowing flue gases are diverted from the top 8 of the stack into means for effecting scrubbing of the gases before allowing the gases to escape to atmosphere. For this purpose, means such as a hood 10 spaced above the upper end of the stack 5 diverts the upwardly flowing flue gases into a downwardly extending scrubbing passage of substantial length defined as by means of a tubular casing 12 extending in spaced relation about and extending downwardly from the hood 10 in spaced relation about the stack 5 and to a sufficient length for the intended purpose.

In the scrubbing passage 11, the flue gases are caused to travel downwardly to the lower open end of the casing 12, and while so traveling in the passage 11, the gases are subjected to a shower of flue gas scrubbing solid particulate material. For this purpose, particulate material dispersing means such as nozzles 13 are located at the upper end of the passage 11, as for example on the hood 10. The construction and arrangement of the particulate material dispersing nozzles 13 is such that a substantially uniform shower of the flue gas scrubbing solid particulate material is supplied through the upper end of the passage 11 to gravitate downwardly in the passage in substantially uniformly scrubbing contact with the downwardly traveling flue gases. Further, the volume of the particulate material is desirably sufficient to cause a down draft in the passage. Because of the mass of the individual particles, they will tend to gravitate at an accelerating speed down the passage 11 and thus draw the gases being scrubbed downwardly in the passage, so that the flue draft in the stack 5 is improved.

Flue gas scrubbing solid particulate material is adapted to be supplied to the dispersing nozzles 13 by means of supply ducts 14 communicating with a supply of the particulate material in a bed 15 which may be contained in a sump defined by a covered receptacle 17 below and in communication with the lower end of the passage 11. Means such as a respective pump 18 driven as by means of a motor 19 may be associated with each of the supply ducts 14 for effecting drawing of the particulate material from the bed 15 through the lower suction ends of the ducts 14 and to drive the particulate material under suitable pressure and velocity to the dispersing heads or nozzles 13. Location of the lower suction ends of the supply ducts 14 near the bottom of the deepest part of the bed 15, as best seen in FIG. 2, assures that at least predominately fresh or cleansed solid particulate material will be drawn from the sump and supplied to the nozzle means 13 and thus to the draft-inducing and scrubbing shower of the solid particulate material. The gas scrubbing and draft-inducing solid particulate material may be any material suitable for the purpose, such as particulate activated carbon, ion exchange resin, an aggregate some of which may be heavy and some light of different materials and some of which may be spongy, or the like, selected to have an affinity for the pollutant or pollutants, it is desired to remove from the gases.

As the scrubbed gases and solid particulate scrubbing material reach the lower end of the passage 11, the pollutant loaded particulate material drops down onto the bed 15 in the sump vessel 17, and the cleansed flue gases are separated from the particulate material at the discharge end of the passage 11 by means comprising a lead-off passageway 20 defined within a tubular casing 21 which may be disposed in a spaced relation about the passageway casing 12. The cleansed gases travel in the passageway 20 in counterdirection to the passageway 11 and exhaust to atmosphere from the open top of the casing 21.

In the collection sump vessel 17, the gas scrubbing solid particulate material 15 is desirably reconditioned for recycling in its gas scrubbing and draft promoting function. For this purpose, there is desirably provided in the sump 17 a suitable volume bath 22 of a conditioning liquid. Such liquid may be, for example, water which may be acidic or alkaline, or may contain other chemical conditioners suitable for cleansing and conditioning and reconditioning the particulate material 15. The liquid 22 may also contain any suitable conditioning chemical or solution which when carried on and with the particles of the particulate material 15 in the scrubbing cycle through the scrubbing passage 11 will enhance attraction to the scrubbing material of the constituents which it is desired to remove from the gases being scrubbed. In any event, the particles of the particulate solid scubbing material as dispersed from the nozzles 13 are preferably wetted in a superficial or saturated condition depending on the particular characteristics of the solid scrubbing material particles. Impervious solid particles will be superficially wetted. Porous particles may be saturated.

Although the conditioning liquid 22 may in and of itself be of a nature to clean the particulate material 15 on contact, additional means are desirably provided for enhancing the conditioning effect of the liquid 22. For this purpose, the sump 17 is equipped with agitating means conveniently comprising a manifold 23 carried on the underside of a preferably frustoconical floor area 24 sloping from the stack 5, and below the discharge end of the scrubbing passage 11, toward a lower portion of the sump wherein the cleansed solid particulate material concentrates in the bed 15 and from which the ducts 14 draw the particulate material. Screened or screen openings 25 effecting communication from the interior of the manifold 23 through the floor 24 provide for turbulent delivery of agitating fluid into the particulate material bed 15 not only to enhance cleansing action of the liquid 22 but also to facilitate concentrating of the cleansed solid particulate material in the lowermost part of the sump 17. If preferred, the agitating fluid may be all or partly a gaseous fluid such as air, but it is preferably at least largely liquid such as make-up liquid supplied through a replenishing duct 27 under the control of a suitable valve 28. This valve may be operated by any desirable liquid level sensing means such as photosenser, float switch, or the like, responsive to the level of the liquid 22 in the sump 17.

Primarily, or in addition to the make-up liquid, the agitating liquid supplied through the manifold 23 may comprise reconditioned liquid derived from the body of liquid 22 in the sump. For this purpose, filter means such as one or more filters 29 may be provided for reconditioning the liquid 22 by drawing the liquid through intakes 30 into the filter body, wherein substances cleaned from the scrubbing material particles are separated from the liquid and removed through a discharge 31. Cleansed or purified liquid is delivered from each of the filters 29 through a duct 32 to the manifold 23 for recycling into the sump 17 and for effecting the desired solid particulate material cleansing agitating action.

To facilitate the reconditioning and recycling of the water 22, the sump structure 17 is desirably provided with a lateral reservoir area 33 from which the solid particulate material bed 15 is separated by a partition 34 of a height sufficient to retain the particulate material bed separate from the reservoir area without interfering with circulation of the conditioning liquid 22 from the area of the material bed 15 into the reservoir area. The recycling filters 29 are preferably associated with the reservoir area 22.

It will thus be apparent that the present invention provides a new and improved gas scrubber and method or system which is adapted for continuous, high performance operation. Large volume, efficient gas scrubbing is provided for. In addition, flue draft is improved. Cleansing and recycling of the solid particulate scrubbing material enhances economy in the operation of the system.

It will be understood that variations and modifications may be effected without departing from the spirit and scope of the novel concepts of this invention.

I claim as my invention:

1. A method of scrubbing and accelerating the draft of flue gases, comprising:

leading flue gases through a flue from a source to a discharge end of the flue;

diverting the flue gases from said discharge end of the flue into the top of a vertical passage extending a substantial length downwardly;

producing a substantially uniform shower of gas-scrubbing at least predominately solid particulate material dispersed in the top of said passage in sufficient solid particulate material volume and individual solid particulate material particle mass to gravitate downwardly in the passage at accelerating speed and thereby effecting not only scrubbing contact of the solid particulate material with the flue gases but also causing a downdraft of the flue gases in the passage and thereby accelerating drawing of flue gases from said discharge end of the flue into said passage and improving flue draft;

and at the lower end of said passage separating the scrubbed gases from the particulate material.

2. A method according to claim 1, comprising reconditioning said solid particulate material for recycling after it leaves the lower end of said passage.

3. A method according to claim 2, wherein said reconditioning and recycling comprises subjecting the solid particulate material to a cleaning liquid in a sump, and effecting concentration of the cleansed solid particulate material in a concentrated bed.

4. A method according to claim 3, including agitating the solid particulate material in a part of said sump and facilitating concentration of the cleansed particulate material in said bed.

5. A method according to claim 4, including collecting cleansing liquid flowing from said sump in a reservoir area, reconditioning the cleaning liquid collected in the reservoir, and returning the reconditioned liquid to the sump for effecting said agitating of the particulate material.

6. A method according to claim 5, comprising effecting said reconditioning in a filter structure, and returning the reconditioned liquid from the filter structure to said sump for effecting said agitating of the particulate material.

7. A method according to claim 1, wherein said flue is defined by a vertical stack having its discharge end at the top of the stack, comprising defining said vertical passage in a first tubular casing disposed in spaced relation about the stack and extending downwardly from adjacent to the top of the stack, diverting the flue gases from the discharge end of the stack through a hood into the top of said passage, producing said shower by discharging the solid particulate material from nozzle means at the top of said passage adjacent to said hood, collecting the solid particulate material below the lower end of said passage, separating the flue gases through a passageway in a second tubular casing located about said first tubular casing and leading upwardly from the lower end of said passage, reconditioning the collected solid particulate scrubbing material received from the lower end of said passage, and recycling the reconditioned solid particulate material to said nozzle means.

8. A method of accelerating draft of flue gases in a flue which leads flue gases from a source to a discharge end of the flue, comprising:
   diverting flue gases from said discharge end of the flue into the top of a vertical passage which extends a substantial length downwardly;
   producing a substantially uniform shower of predominately solid particulate material from the top of said passage and dispersing the solid particulate material in sufficient solid particulate material volume and adequate individual solid particulate material mass within the passage to gravitate downwardly in the passage at accelerating speed and thereby causing a downdraft of the flue gases in said passage and causing drawing of the flue gases from the discharge end of the flue into the passage and accelerating flue draft;
   and separating the flue gases from the particulate material at the lower end of said passage.

9. A method according to claim 8, including reconditioning the solid particulate material received from the lower end of said passage, and recycling the reconditioned solid particulate material to said substantially uniform shower.

* * * * *